US011498669B1

(12) United States Patent
Hunter et al.

(10) Patent No.: US 11,498,669 B1
(45) Date of Patent: Nov. 15, 2022

(54) ROTOR SYSTEM (71) Applicant: LOCKHEED MARTIN CORPORATION, Bethesda, MD (US)

(72) Inventors: David H. Hunter, Cheshire, CT (US); David N. Schmaling, Southbury, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/242,155

(22) Filed: Apr. 27, 2021

(51) Int. Cl.
*B64C 27/10* (2006.01)
*B64C 27/48* (2006.01)
*B64C 27/35* (2006.01)

(52) U.S. Cl.
CPC ............. *B64C 27/10* (2013.01); *B64C 27/35* (2013.01); *B64C 27/48* (2013.01)

(58) Field of Classification Search
CPC .................................................. B64C 27/48
See application file for complete search history.

(56) References Cited

U.S. PATENT DOCUMENTS

| 4,547,127 A | 10/1985 | Frommlet et al. |
| 4,755,106 A | 7/1988 | Coffy |
| 5,499,903 A | 3/1996 | Schmaling et al. |
| 7,695,249 B2 * | 4/2010 | Krauss .................... B64C 27/10 416/134 A |
| 9,169,011 B2 | 10/2015 | Hunter et al. |
| 9,499,262 B2 | 11/2016 | Foskey et al. |
| 10,214,284 B2 * | 2/2019 | Hunter .................... B64C 27/48 |
| 10,822,076 B2 | 11/2020 | Hunter et al. |
| 10,906,639 B2 * | 2/2021 | Dunn ....................... F16B 43/00 |
| 2008/0131280 A1 | 6/2008 | Krauss et al. |
| 2020/0047880 A1 * | 2/2020 | Dunn ....................... F16C 35/02 |

FOREIGN PATENT DOCUMENTS

EP 2 570 346 A1 3/2013

OTHER PUBLICATIONS

Extended European Search Report on European Patent Application No. 22168967.2 dated Sep. 8, 2022 (18 pages).

* cited by examiner

*Primary Examiner* — Ninh H. Nguyen
*Assistant Examiner* — John S Hunter, Jr.
(74) *Attorney, Agent, or Firm* — Foley & Lardner LLP (57) ABSTRACT

An extension assembly for a rotor system for rotating a plurality of rotor blades about a rotor axis with a central rotor hub that defines the rotor axis includes a beam assembly and a first bearing assembly. The beam assembly is configured to attach to the central rotor hub and is positioned at least partially within a corresponding one of the plurality of rotor blades. The first bearing assembly is configured to be fastened to the beam assembly and to at least one of a leading edge or a trailing edge of the corresponding one of the plurality of rotor blades.

14 Claims, 9 Drawing Sheets

ROTOR SYSTEM

FIELD

The present application relates generally to a rotor system of a rotary wing aircraft.

BACKGROUND

Rotor systems of rotary wing aircraft typically have elastomeric bearings to react to blade root movements. The amount of radial loads (relative to the bearing) determines the size of the bearings. Some rotor systems have addressed this issue by using a flexible beam (a flexbeam) design to share load with the bearings.

Other rotor systems increase the spacing of the bearings to reduce the load magnitude. In particular, a spindle nose or cylindrical extension may be added to a frame structure which mounts the pitch bearing (that is used to react blade bending induced radial loads). The spindle nose is used to increase the spacing between the pitch bearings.

Conventional rotor systems (in particular coaxial rotor systems) are limited by stiffness and stress, which may affect the overall aircraft performance.

SUMMARY

Flexbeam configurations as described above may result in a less desirable aerodynamic shape for the inboard portion of the rotor blade. Further, spindle nose configurations as described above may twist the frame structure, thereby decreasing the effective stiffness and creating additional stresses on the frame structure. Additionally, the centrifugal bearing loads the outboard end of the frame structure and induces steady bending stresses in the frame structure and the hub arms. The present disclosure addresses these and other issues.

Various embodiments provide for an extension assembly for a rotor system for rotating a plurality of rotor blades about a rotor axis with a central rotor hub that defines the rotor axis. The extension assembly includes a beam assembly and a first bearing assembly. The beam assembly is configured to attach to the central rotor hub and is positioned at least partially within a corresponding one of the plurality of rotor blades. The first bearing assembly is configured to be fastened to the beam assembly and to at least one of a leading edge or a trailing edge of the corresponding one of the plurality of rotor blades.

Various other embodiments provide for a rotor system that comprises a plurality of rotor blades, a central rotor hub, and a plurality of extension assemblies. The central rotor hub defines a rotor axis and is configured to rotate the plurality of rotor blades about the rotor axis. The plurality of extension assemblies is configured to attach to the central rotor hub and are positioned at least partially within a corresponding one of the plurality of rotor blades. One or more of the plurality of extension assemblies comprises a first bearing assembly configured to be fastened to at least one of a leading edge or a trailing edge of the corresponding one of the plurality of rotor blades. The first bearing assembly is disconnected from a top portion and a bottom portion of the corresponding one of the plurality of rotor blades.

These and other features (including, but not limited to, retaining features and/or viewing features), together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a rotor system that is configured allow a more efficient structural load path compared to previous rotor systems. As described further herein, the particular configuration of the disclosed rotor system eliminates a torsion component in bending reaction path and allows for a line of action to react to centrifugal forces. The area of connection between the rotor blade and the rotor hub (via the extension assembly) is altered to move to a lower stress region of the rotor blade. Furthermore, the rotor system has a lower weight, is more compact, and may be less expensive than conventional rotor systems. The configuration of the present rotor system can be more easily machined while providing a more efficient structural arrangement and load path through the rotor system.

Rotor System

Figure 1A:
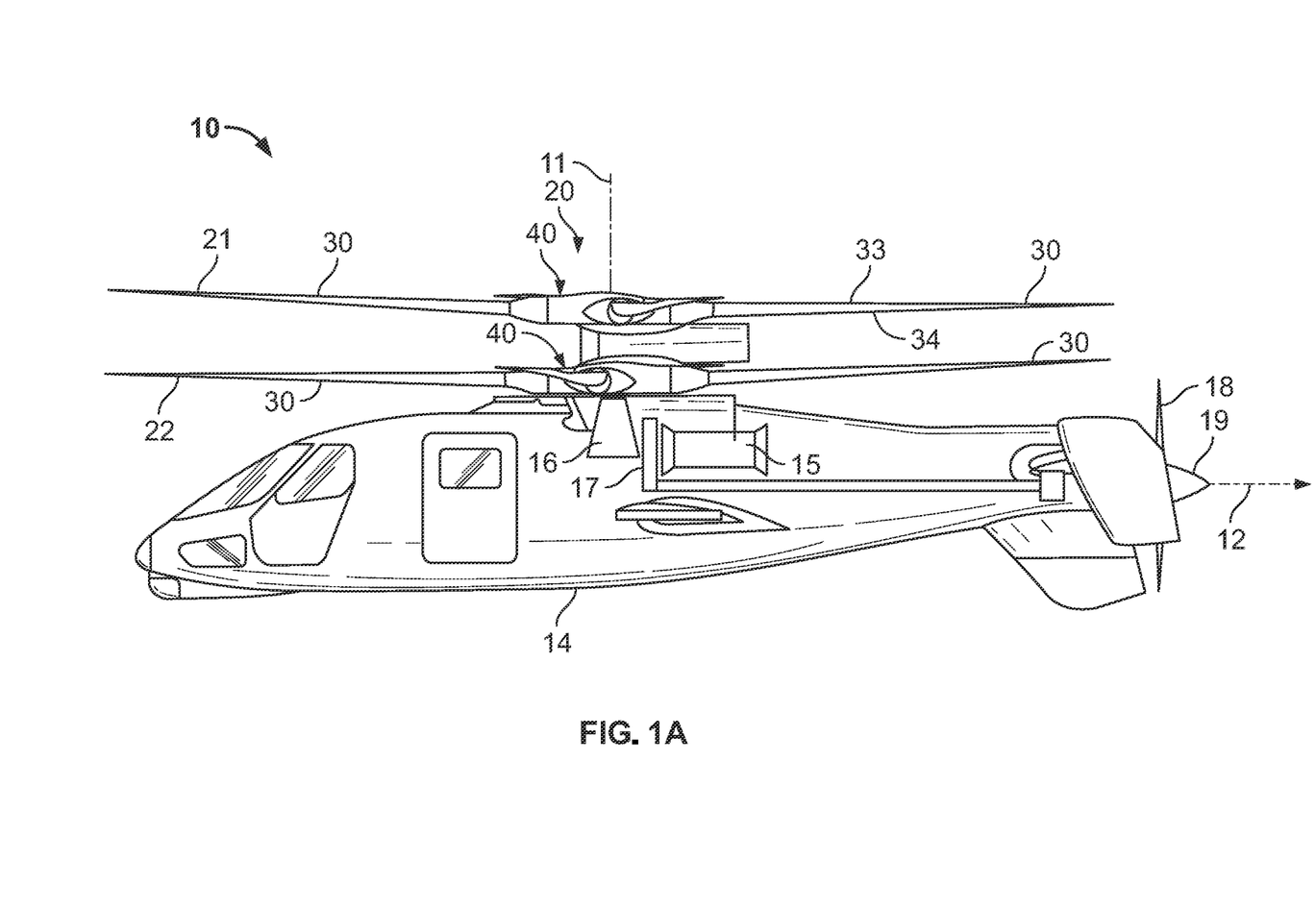
FIG. 1A is a side view of an aircraft according to one embodiment.
Figure 1B:
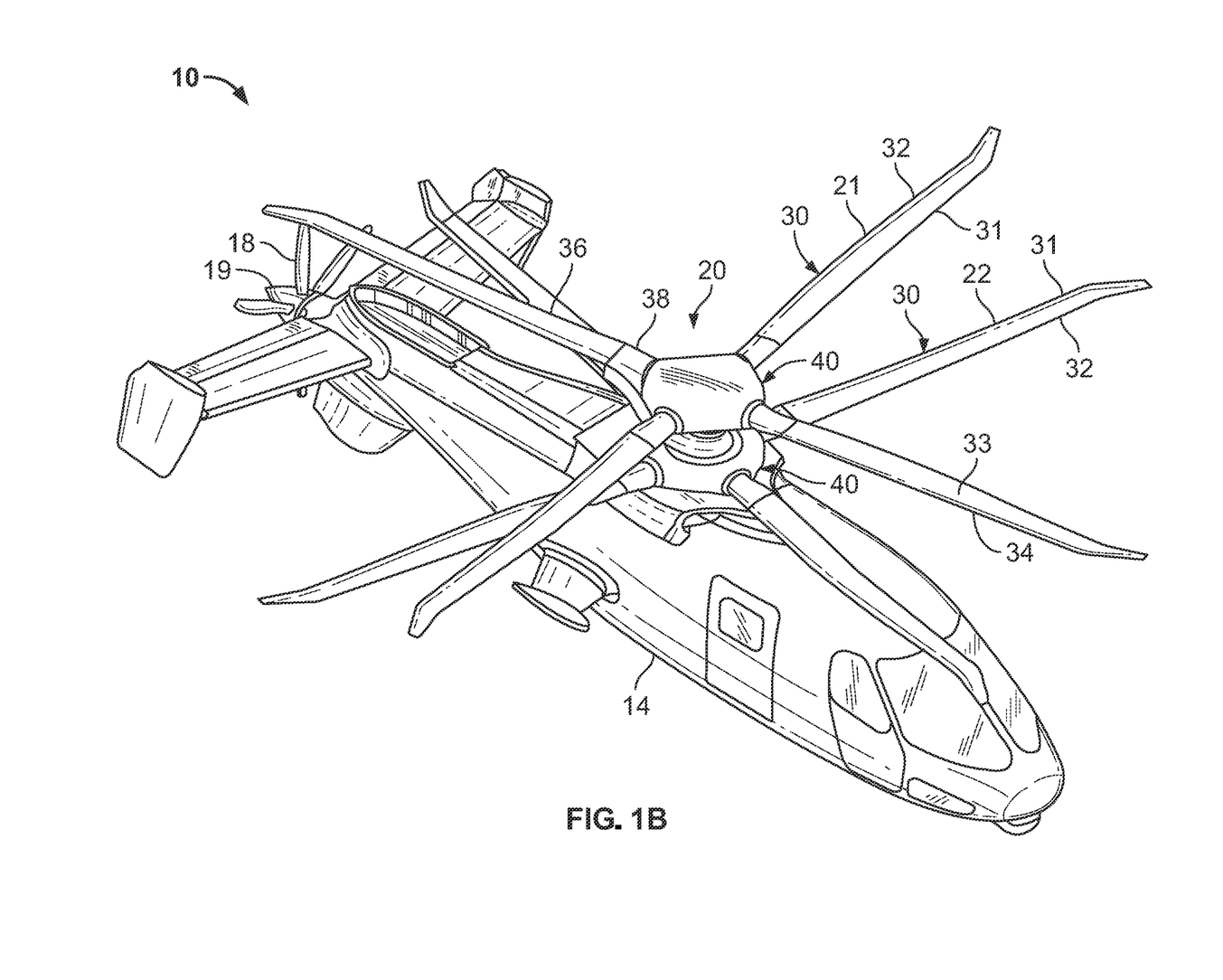
FIG. 1B is a perspective view of the aircraft of FIG. 1A.

FIGS. 1A-1B illustrate an exemplary vertical takeoff and landing (VTOL) high speed compound or coaxial counter-rotating rigid rotary wing aircraft 10 (which may be, for example, a helicopter or a variety of other devices which include at least one rotor blade). The aircraft 10 includes an aircraft body or airframe 14, a dual, counter-rotating, coaxial main rotor system 20, a translational thrust system 18, a transmission 16, and at least one engine 15 (which may be a gas turbine engine). The overall structure and configuration of the aircraft 10 may have a variety of different configurations, including but not limited to the structures disclosed in U.S. Pat. No. 10,822,076, the entirety of which is incorporated by reference for the systems and apparatus disclosed therein. The airframe 14 is a non-rotating frame (relative to the main rotor system 20 and the translational thrust system 18) and supports the main rotor system 20 and the translational thrust system 18.

The main rotor system 20 is driven by the transmission 16 and rotates about a central hub or rotor axis 11. The rotor axis 11 corresponds to the flapwise axis of the rotor blade 30. According to various embodiments, the main rotor system 20 may be a coaxial rotor system that includes an upper rotor assembly 21 and a lower rotor assembly 22 as dual counter-rotating main rotors in a coaxial configuration. The upper rotor assembly 21 is positioned above the lower rotor assembly 22. The upper rotor assembly 21 and the lower rotor assembly 22 are rotated about the same, single axis (i.e., the rotor axis 11) and may include concentric hub shafts or masts. According to various embodiments, a computer or microcomputer is provided with a processor and a memory and is configured to carry out a control to send a command to cause the rotor assembly 20 to control the upper rotor assembly 21 and the lower rotor assembly 22, in particular to rotate the upper rotor assembly 21 and the lower rotor assembly 22 in opposite directions and to control the timing of rotation to cancel out the net torque on the other rotor assembly in real-time, thereby providing a net-zero torque about the airframe 14, increasing the stability of the aircraft 10, and increasing the hovering capabilities of the aircraft 10. However, according to various other embodiments, the main rotor system 20 may not be coaxial and may only include one rotor assembly.

Figure 3A:
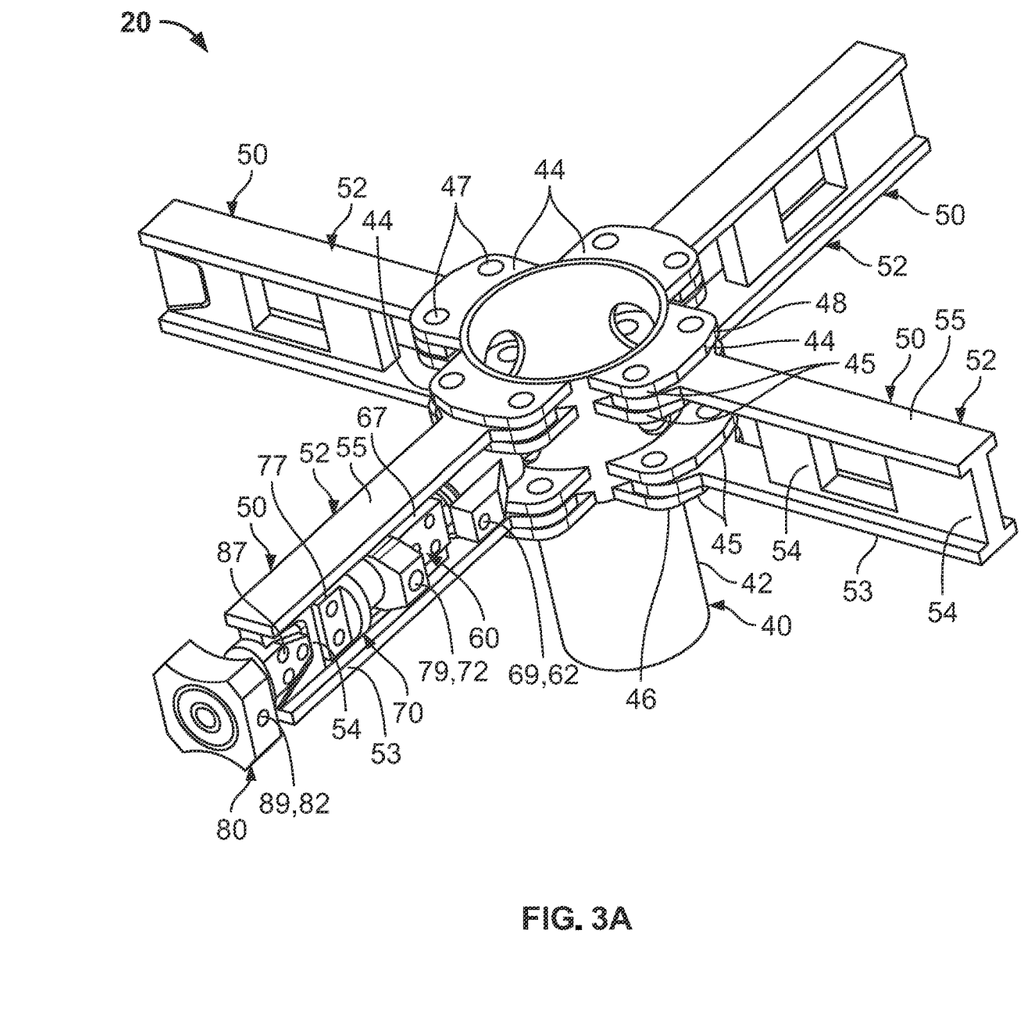
FIG. 3A is a perspective view of a portion of the rotor system of FIG. 2A.

As described further herein, the main rotor system 20 includes a plurality of main rotor blades 30 (e.g., a rotor blade spar), a plurality of extension assemblies 50 (as shown in FIG. 3A and corresponding to each of the rotor blades 30), and at least one central rotor hub 40. In particular, each of the upper rotor assembly 21 and the lower rotor assembly 22 includes a set of rotor blades 30, a set of corresponding extension assemblies 50, as well as a central rotor hub 40 (as described further herein) to which each of the extension assemblies 50 is attached. The rotor system 20 is configured to rotate the rotor hub 40 (and thus also the rotor blades 30 and the extension assemblies 50) about the rotor axis 11.

The translational thrust system 18 provides translational thrust generally parallel to an aircraft longitudinal axis 12 (that extends along the length of the aircraft 10). The translational thrust system 18 may be selected from one of a plurality of propeller systems including, but not limited to a pusher propeller, a tractor propeller, a nacelle mounted propeller, etc. In the example of FIGS. 1A-1B, the translational thrust system 18 includes an auxiliary propulsor 19. In an embodiment, the auxiliary propulsor 19 is a pusher propeller system with a propeller rotational axis oriented substantially horizontal and parallel to the aircraft longitudinal axis 12 to provide thrust for high speed flight. The translational thrust system 18 may be driven through a main gearbox 17 which also drives the main rotor system 20.

The transmission 16 includes the main gearbox 17 driven by the one or more engines 15. The main gearbox 17 and the engines 15 may be mounted on the airframe 14 of the aircraft 10. Thus, the main gearbox 17 and engines 15 form part of the overall assembly including airframe 14. In the case of a rotary wing aircraft, the main gearbox 17 may be interposed between the one or more engines 15, the main rotor system 20, and the translational thrust system 18. In one embodiment, the main gearbox 17 is a split torque gearbox which carries torque from the engines 15 through a multitude of drivetrain paths.

Although a particular rotary wing aircraft configuration is illustrated and described in the disclosed non-limiting embodiment, other configurations and/or machines with rotor systems are within the scope of the present disclosure. It is to be appreciated that while the description herein relates to a rotary wing aircraft with a dual coaxial counter-rotating rotor system, the disclosure herein may be as readily applied to other rotor systems, such as turboprops, tilt-rotors, and tilt-wing aircraft, or a conventional single rotor system.

Rotor Blade

The rotor system 20 (in particular each of the rotor assemblies 21, 22) may include any number of rotor blades 30, such as three or four rotor blades 30, that rotate with the rotor hub 40 and the corresponding extension assembly 50, about the rotor axis 11. Each of the rotor blades 30 is directly mounted to a respective extension assembly 50. The rotor blades 30 are circumferentially spaced apart from each other about the respective rotor hub 40. Although the extension assemblies 50 and the rotor hub 40 are shown herein with the main rotor blades 30, according to various other embodiments, the extension assemblies 50 and the rotor hub 40 may be used with other types of rotor blades.

As shown in FIGS. 1B-2A, each of the rotor blades 30 includes a rotor blade body 36 and a rotor blade neck 38. The blade neck 38 is radially closer to the rotor hub 40 than the blade body 36, and the blade body 36 extends radially outward from the blade neck 38 (and radially outward from the extension assembly 50) and provides the main lifting surface for the rotor blade 30. The blade body 36 terminates at the outboard end or tip of the rotor blade 30. Optionally, the blade neck 38 and the blade body 36 may be two separate components that are attachable (and removable and reattachable) to each other. Alternatively, the blade neck 38 and the blade body 36 may be constructed as a single, integral, unitary piece or component that cannot be separated without destruction. The blade body 36 may be a radially-outer aerodynamic portion of the rotor blade 30, and the blade neck 38 may be a radially-inner portion of the rotor blade 30 that provides an area to at least partially house or contain and to attach to the various bearing assemblies 60, 70, 80 (as described further herein).

Figure 2A:
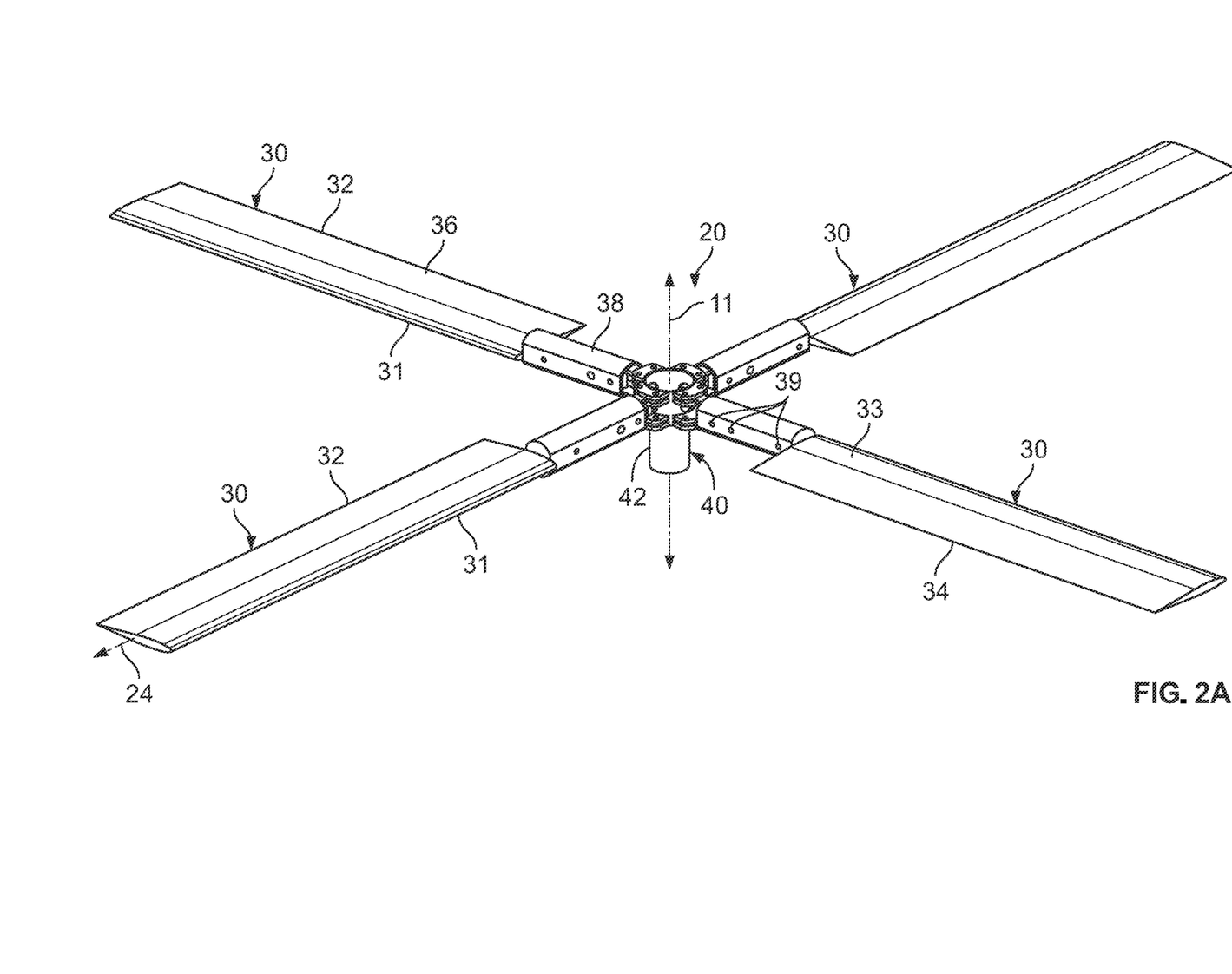
FIG. 2A is a perspective view of a rotor system that may be used within the aircraft of FIG. 1A, according to one embodiment.
Figure 2B:
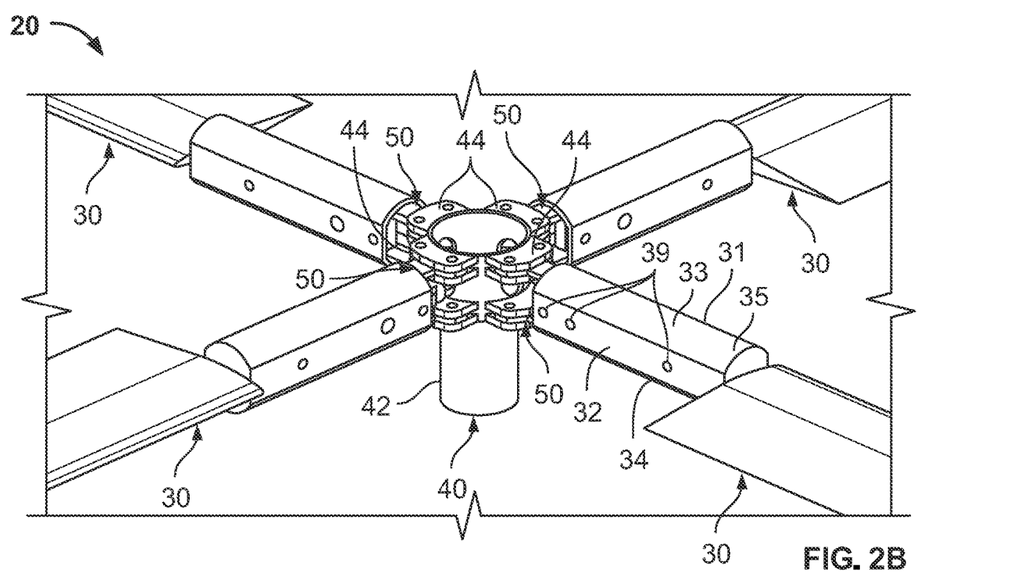
FIG. 2B is a perspective view of a portion of the rotor system of FIG. 2A.
Figure 2C:
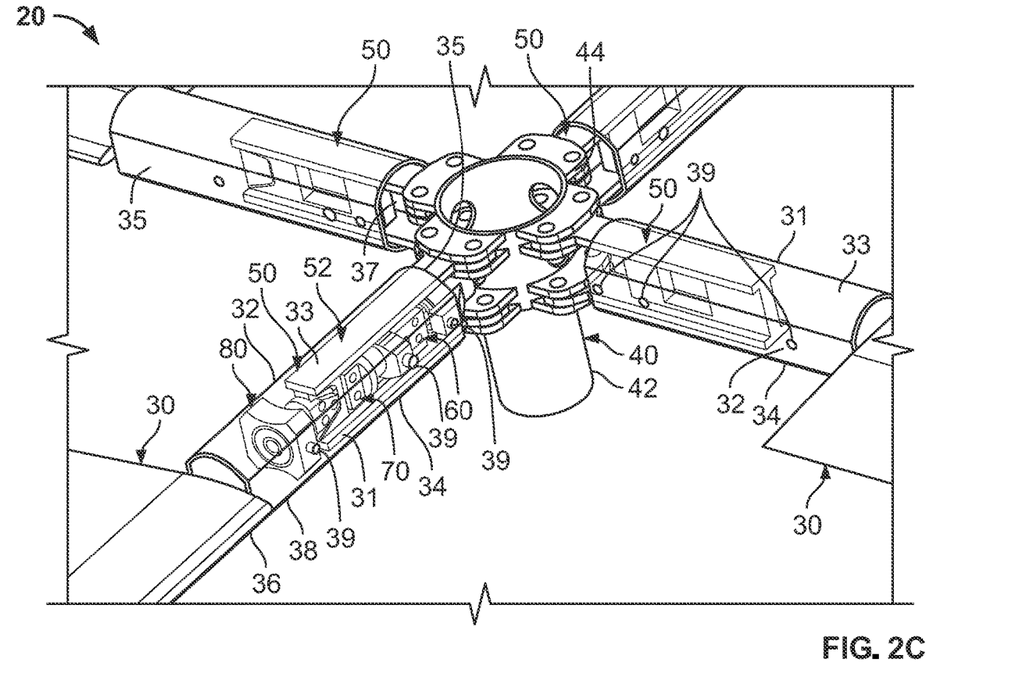
FIG. 2C is a perspective view of a portion of the rotor system of FIG. 2A, with the rotor blade partially transparent.

As shown in FIG. 2C, each of the rotor blades 30 has an outer wall 35 with an outer aerodynamic surface that extends along (and is a part of) both the blade body 36 and the blade neck 38. At least a portion of the outer wall 35 of the rotor blade 30 (in particular along at least a portion of the blade neck 38) defines an inner portion or area 37 such that the outer wall 35 forms a housing that houses at least a portion of the extension assembly 50.

As described further herein and shown in FIG. 2C, the blade neck 38 of the rotor blade 30 is configured to directly attach to a corresponding one of the extension assemblies 50. In particular, at least a portion of the extension assembly 50 extends into, is positioned within, and is housed within a portion of the inner area 37 of the rotor blade 30 that is along the blade neck 38. At least a portion of the rotor blade 30 extends radially outwardly from the extension assembly 50.

As shown in FIG. 2A, the rotor blade 30 includes a leading edge 31 and a trailing edge 32 that each extend along both the blade body 36 and the blade neck 38. The leading edge 31 is the upstream edge of the rotor blade 30, and the trailing edge 32 is the downstream edge of the rotor blade 30 in the rotational direction of travel of the rotor blade 30 about the rotor axis 11. The leading edge 31 and the trailing edge 32 each extend along the radial length of the rotor blade 30 and are opposite each other.

The rotor blade 30 further includes a top side or portion 33 and a bottom side or portion 34 that each extend along both the blade body 36 and the blade neck 38. The top portion 33 faces axially upward, away from the airframe 14. The bottom portion 34 faces axially downward, toward the airframe 14. The top portion 33 and the bottom portion 34 each extend along the radial length of the rotor blade 30, are opposite each other, and extend between the leading edge 31 and the trailing edge 32. Similarly, the leading edge 31 and the trailing edge 32 each extend between the top portion 33 and the bottom portion 34.

As shown in FIGS. 2A-2C, the rotor blade 30 defines a plurality of blade attachment holes 39 (e.g., through-holes) that each extend through the outer wall 35 of the rotor blade 30 and provide areas to individually attach to the bearing assemblies 60, 70, 80, as described further herein. The blade attachment holes 39 are positioned along the leading edge 31 and the trailing edge 32 of the rotor blade 30 (along the blade neck 38) (rather than the top portion 33 and the bottom portion 34 of the rotor blade 30). According to one embodiment, the rotor blade 30 includes two blade attachment holes 39 for each of the three bearing assemblies 60, 70, 80 (i.e., a total of six blade attachment holes 39 on the rotor blade 30), where a first blade attachment hole 39 for one of the three bearing assemblies 60, 70, 80 is positioned along the leading edge 31 and a second blade attachment hole 39 for the one of the three bearing assemblies 60, 70, 80 is positioned along the trailing edge 32, directly opposite the first blade attachment hole 39. Each of the three bearing assemblies 60, 70, 80 is attached to the rotor blade 30 at the top opposite blade attachment holes 39. Accordingly, each rotor blade 30 is attached to the corresponding extension assembly 50 at six different attachment locations (i.e., at the six blade attachment holes 39), all of which are along the leading edge 31 or the trailing edge 32 of the rotor blade 30.

Figures 6, 7, 8:
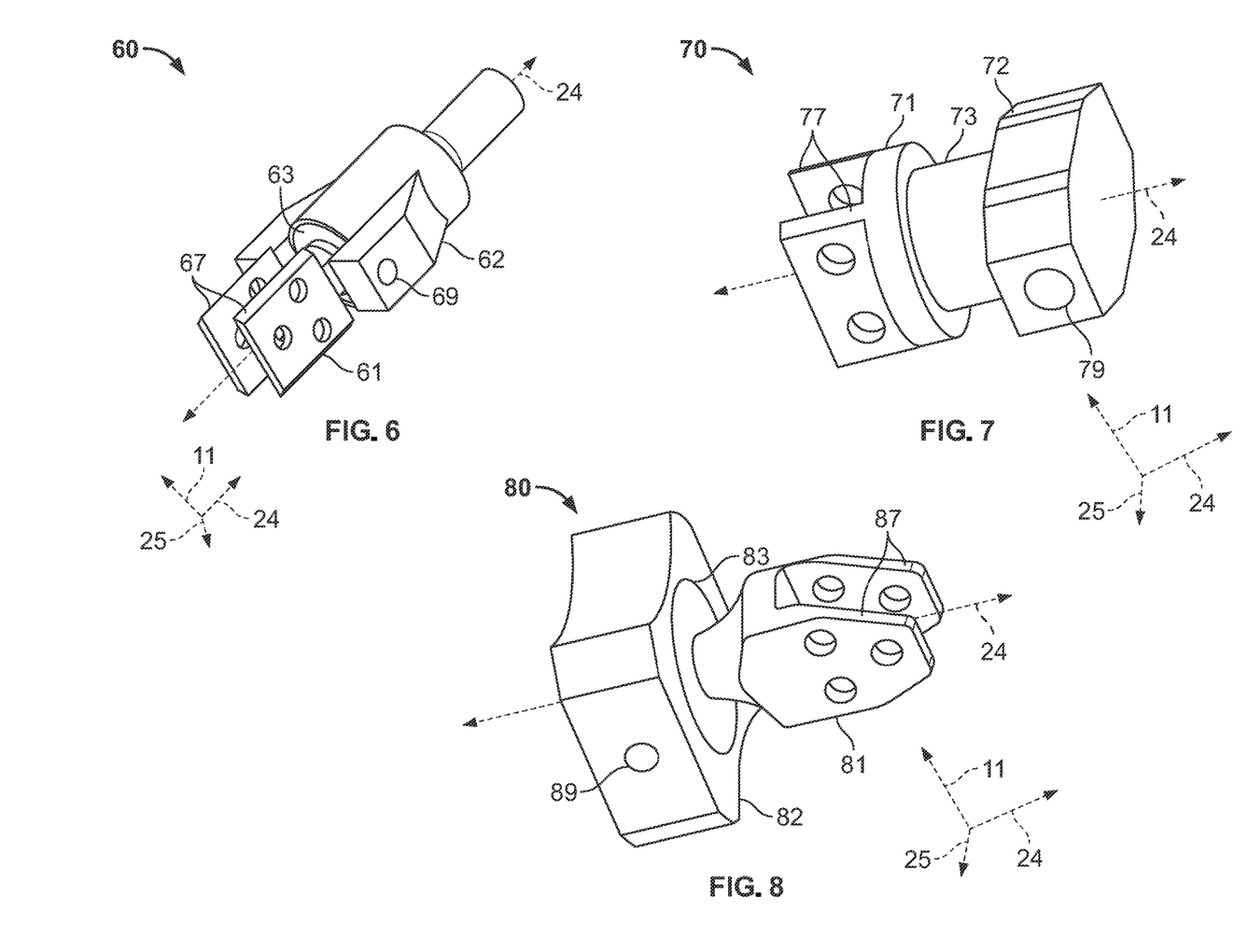
FIG. 6 is a perspective view of an inboard pitch bearing assembly of the rotor system of FIG. 2A.
FIG. 7 is a perspective view of a centrifugal bearing assembly of the rotor system of FIG. 2A.
FIG. 8 is a perspective view of an outboard pitch bearing assembly of the rotor system of FIG. 2A.

The longitudinal, pitch, or feathering axis 24 of the rotor blade 30 refers to the axis about which the pitch angle of the rotor blade 30 is varied and the direction of centrifugal force of the rotor blade 30. In particular, the rotor blade 30 pitches, rotates, feathers, or twists about its feathering axis 24 about at least one bearing assembly 60, 70, 80 (as described further herein) to change the pitch angle, which changes the lift and drag. For example, by increasing the pitch angle, the rotor blade 30 provides more lift. Conversely, by decreasing the pitch angle, the rotor blade 30 provides less lift. As shown in FIG. 2A, the feathering axis 24 extends substantially perpendicular to the rotor axis 11. As shown in FIGS. 6-8, the feathering axis 24 and the rotor axis 11 extend substantially perpendicular to an edgewise axis 25.

Central Rotor Hub

The central rotor hub 40 (e.g., a hub body) is configured to rotate about and define the rotor axis 11 (thereby rotating the rotor blades 30 and the extension assemblies 50 about the rotor axis 11), and the rotor blades 30 and the extension assemblies 50 are mounted to the rotor hub 40. As shown in FIGS. 2B-2C, the rotor hub 40 includes a hub mast 42 and a plurality of hub attachment portions 44. The rotor hub 40 may be constructed as a single, integral, unitary piece or component that cannot be separated without destruction. According to various other embodiments, the rotor hub 40 may be constructed out of metal (such as titanium).

Figure 5A:
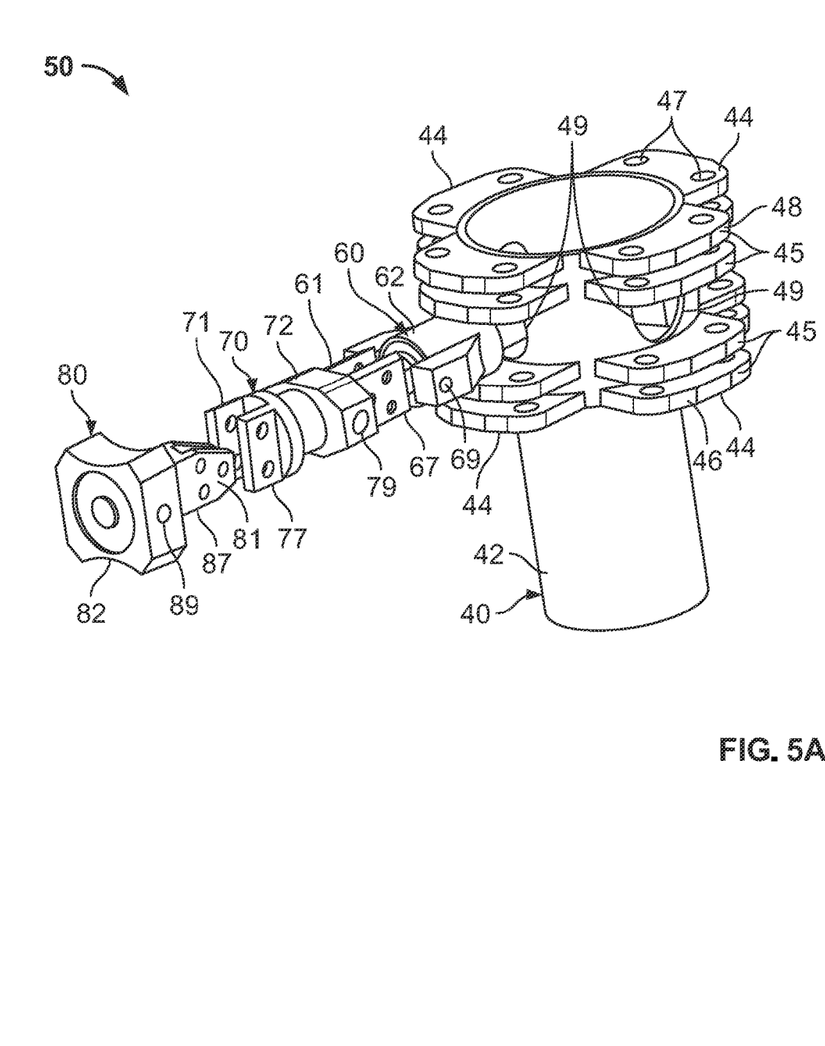
FIG. 5A is a perspective view of a portion of the rotor system of FIG. 2A.
Figure 5B:
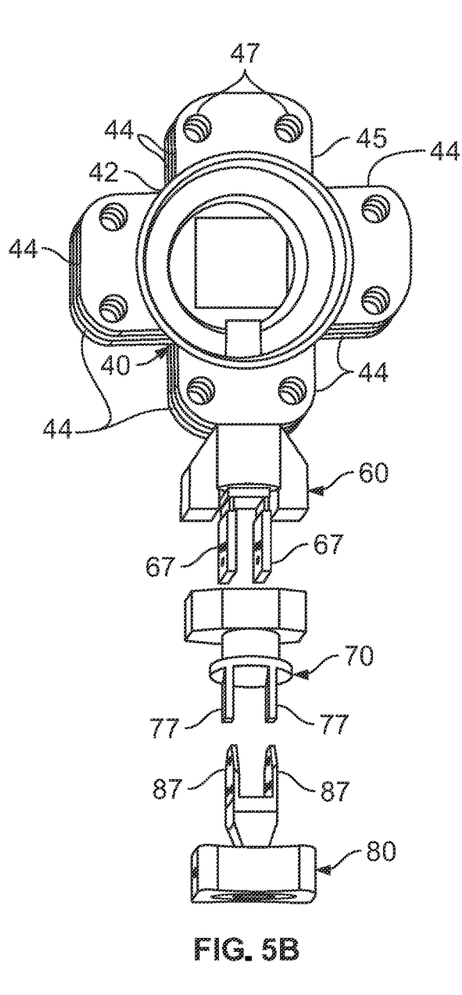
FIG. 5B is a top view of a portion of the rotor system of FIG. 2A.

The rotor hub shaft or mast 42 extends upwardly along and around the rotor axis 11 and is rotated about the rotor axis 11 relative to the airframe 14 to rotate the rest of the rotor hub 40 (and thus the rotor blades 30) about the rotor axis 11. As shown in FIG. 5B, the hub mast 42 includes an outer wall that defines a hollow inner area, within which a portion of the inboard pitch bearing assembly 60 can extend, as described further herein.

As shown in FIG. 2B, each of the rotor hub attachment sites or portions 44 corresponds to one of the extension assemblies 50 and the corresponding one of the rotor blades 30. The hub attachment portions 44 provide an area along the rotor hub 40 for each of the extension assemblies 50 to attach or mount to. As shown in FIG. 5A, each of the hub attachment portions 44 extends radially outwardly from an outer surface and perimeter of the hub mast 42 and are positioned about an outer circumference of the hub mast 42 (circumferentially spaced apart from each other about the hub mast 42). Each of the hub attachment portions 44 may include an upper attachment portion 48 and a lower attachment portion 46, which correspond and attach to a top beam 55 and a bottom beam 53, respectively, of an extension frame 52 of the extension assembly 50 (as described and shown further herein). The upper attachment portion 48 and the lower attachment portion 46 are at least partially radially and transversely aligned with each other and are configured to statically attach to a portion (i.e., the extension frame 52) of a corresponding one of the extension assemblies 50.

Figure 3B:
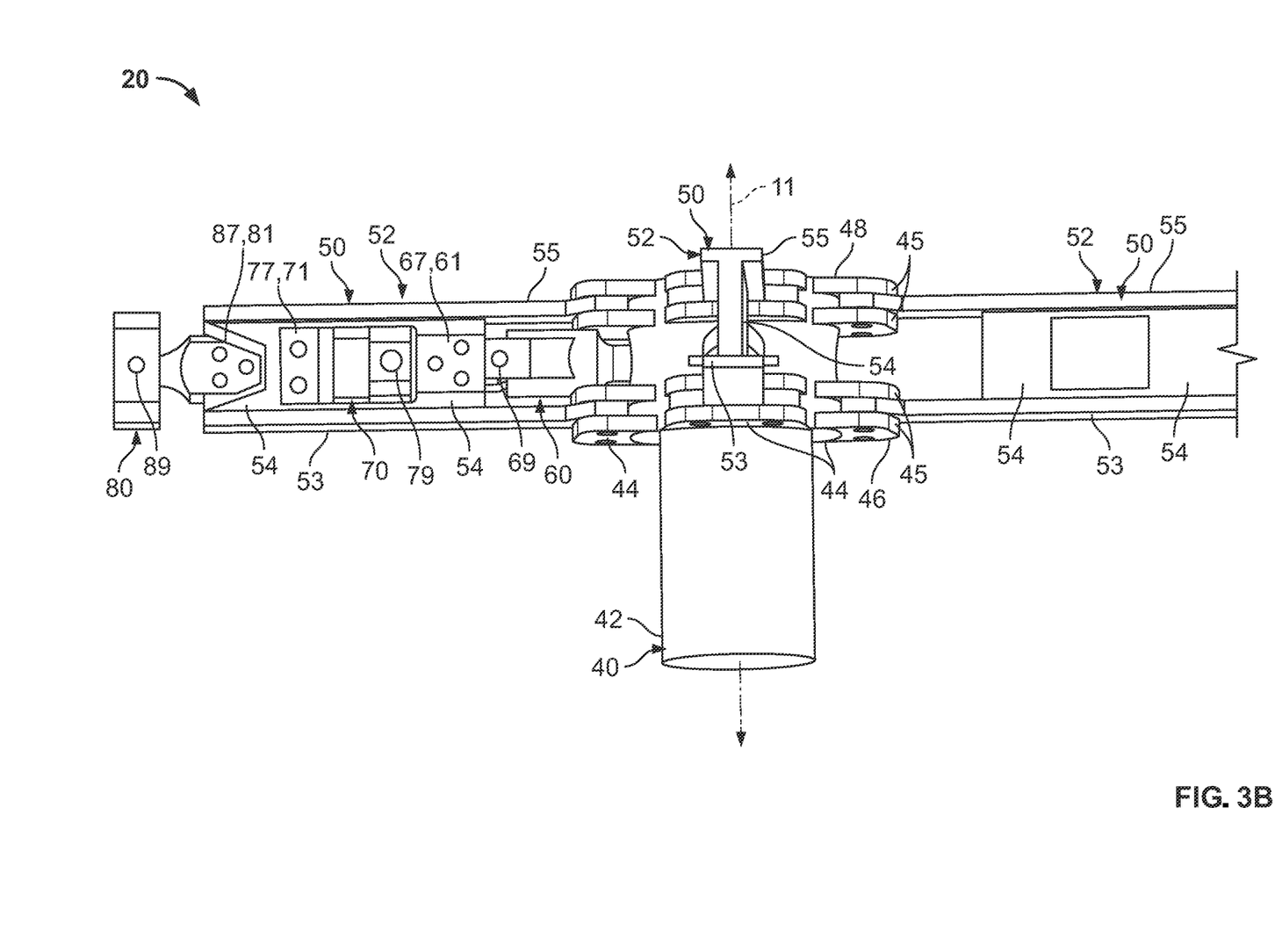
FIG. 3B is a side view of a portion of the rotor system of FIG. 2A.

Each of the lower attachment portion 46 and the upper attachment portion 48 includes at least one hub arm projection or extension 45 that extends radially outward from an outer surface of the hub mast 42. According to one embodiment, each of the lower attachment portion 46 and the upper attachment portion 48 includes a set of extensions 45 (e.g., two or more extensions 45) that are positioned together and radially and transversely aligned with each other. As shown in FIG. 3B and described further herein, the two extensions 45 of each of the lower attachment portion 46 and the upper attachment portion 48 are positioned and extend radially along the top surface and the bottom surface along the radial ends of the bottom beam 53 and the top beam 55, respectively.

As shown in FIG. 5B, each of the extensions 45 defines at least one (preferably two) through-hole 47 that is configured to receive a fastener (e.g., a bolt or screw) to statically or rigidly attach to the extension frame 52 by, for example, a bolted connection. According to one embodiment, the two through-holes 47 are transversely spaced apart from each other along the length of the extension 45. The through-holes 47 of one of the extensions 45 in a set (of the lower or upper attachment portion 46, 48) are radially and transversely aligned with corresponding through-holes 47 of the other of the extensions in a set and with through-holes 57 of the extension frame 52 such that the fastener can extend through each of the extensions 45 within a set of the extensions 45 and through the bottom or top beam 53, 55 of the extension frame 52.

As shown in FIG. 5A, each of the hub attachment portions 44 defines a hub through-hole 49 that extends radially through the hub mast 42. The hub through-hole 49 is positioned axially between and is radially aligned with the lower attachment portion 46 and the upper attachment portion 48. The hub through-hole 49 provides an area for an end portion of the inboard pitch bearing assembly 60 (as described further herein) to extend into and through the outer wall of the hub mast 42 (and into an inner area of the hub mast 42, as shown in FIG. 5B).

Extension Assembly

Each of the extension assemblies 50 are configured to attach a respective one of the rotor blades 30 to the rotor hub 40. Since the rotor system 20 (in particular each of the rotor assemblies 21, 22) may include any number of rotor blades 30, the rotor system 20 includes the same number of extension assemblies 50 and rotor blades 30, such that each rotor blade 30 has a corresponding extension assembly 50.

The extension assembly 50 (and thus also the corresponding rotor blade 30) rotates with the rotor hub 40 about the rotor axis 11.

As described further herein, each of the extension assemblies 50 includes a beam assembly (referring to herein as an extension frame 52) and a plurality of bearing assemblies 60, 70, 80 that are each configured to attach or fasten to and disposed in or on the extension frame 52. The portions other than the extension frame 52 are not shown in three of the four extension assemblies 50 in FIGS. 2C-3B, and none of the extension frames 52 are shown in FIGS. 5A-5B solely for ease of review. It is understood that these portions not shown are nevertheless included.

Each of the extension assemblies 50 is configured to be directly mounted, fastened, or attached to a corresponding one of the rotor blades 30 and to the rotor hub 40 (specifically to a corresponding one of the hub attachment portions 44 of the rotor hub 40). Accordingly, each of the extension assemblies 50 attach one of the rotor blades 30 to the rotor hub 40 such that the rotor blade 30 is not otherwise attached or mounted to (i.e., are detached, separated, or disconnected from) the rotor hub 40. According to one embodiment, the rotor blades 30 may be only indirectly attached to the rotor hub 40 via the respective one of the extension assemblies 50 (e.g., each of the extension assemblies 50 provides a connection between the corresponding rotor blade 30 and the rotor hub 40), allowing the rotor blades 30 to move (e.g., pivot or flap) relative to the rotor hub 40. Accordingly, the rotor blades 30 may not be directly mounted, fastened, or attached to the rotor hub 40. The extension assemblies 50 are circumferentially spaced apart from each other about the rotor hub 40 (and radially and tangentially aligned with a corresponding one of the rotor blades 30 and a corresponding one of the hub attachment portions 44). Each extension assembly 50 extends extend radially outwardly from the rotor hub 40.

As shown in FIG. 2C, at least a portion of each of the extension assemblies 50 is positioned within and extends into the inner area 37 of a corresponding one of the blade necks 38 of the rotor blade 30. A radially-inward end portion of the extension assembly 50 extends beyond a radially inward end of the rotor blade 30 (in particular of the blade neck 38) to attach to the rotor hub 40. Optionally an end portion of the inboard pitch bearing assembly 60 of the extension assembly 50 may extend through the hub throughhole 49 and into the rotor hub 40 (as shown in FIGS. 5A-5B).

Extension Frame of the Extension Assembly

The hub arm extension or extension frame 52 of the extension assembly 50 is configured to be mounted, attached, bolted, or fastened to a respective one of the hub attachment portions 44 of the rotor hub 40 (in a static, rigid, or fixed manner) such that the bearing assemblies 60, 70, 80 are attached to the rotor hub 40 via the extension frame 52. The extension frame 52 provides an area for each of the bearing assemblies 60, 70, 80 to individually mount, attach, or fasten to.

The extension frame 52 provides a central mounting area for the bearing assemblies 60, 70, 80 to attach to with a clevis-type attachment to the rotor hub 40. Comparatively, typical rotor systems include two laterally-displaced hub arms that the bearings are positioned between. The particular orientation, configuration, shape, and structure of the extension frame 52, as described further herein, provides a more efficient structural arrangement and decreases the overall weight and cost of the rotor system 20 (compared to conventional rotor systems). Furthermore, due to the shape of the extension frame 52, the extension frame 52 may optionally be a composite beam, which decreases the weight of the overall weight of the rotor system 20 (compared to using metal for the extension frame). However, according to various other embodiments, the extension frame 52 may be constructed out of metal (such as titanium).

The extension frame 52 is a separate component from (and is separately formed from and attachable to) the rotor hub 40. Comparatively, conventional rotor systems include a single, integral rotor hub that the bearings are directly attached to (rather than via such an extension frame 52 that is a separate component from the rotor hub), which creates manufacturing limitations as an integral structure, requires a large amount of material to machine, and is more difficult to machine. The configuration of the extension frame 52 and the rotor hub 40 allows the extension frame 52 and the rotor hub 40 together to avoid expensive forging with limited locations capable of machining the hub configuration. For example, the rotor hub 40 has a more compact body, allowing the rotor hub 40 to be more easily machined with less material.

Figure 4:
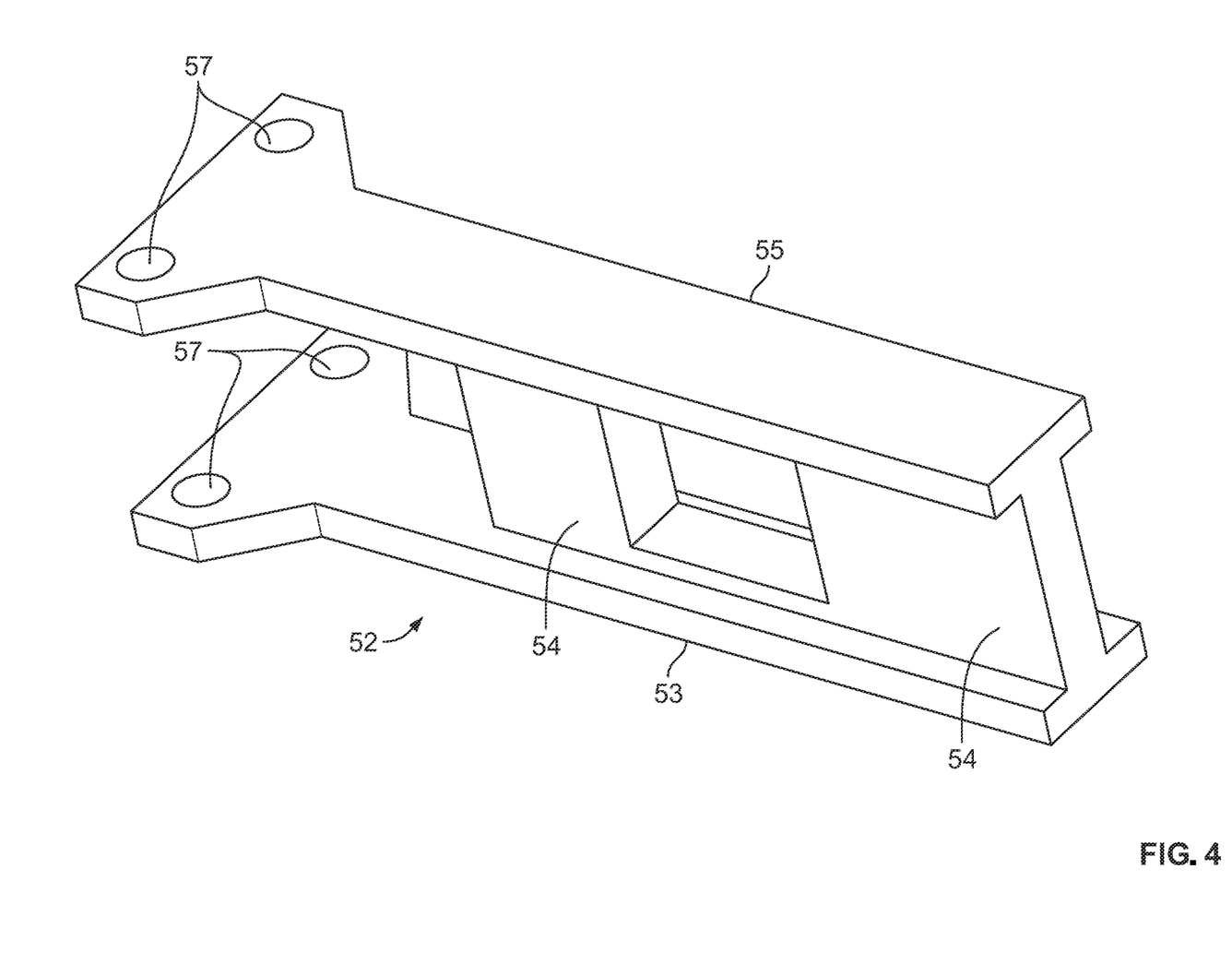
FIG. 4 is a perspective view of an extension frame of the rotor system of FIG. 2A.

As shown in FIG. 4, the extension frame 52 includes a bottom beam 53, at least one central beam 54 (preferably a plurality of central beams 54), and a top beam 55. The extension frame 52 may be constructed as a single, integral, unitary piece or component that cannot be separated without destruction. The bottom beam 53, the central beam 54, and the top beam 55 may form an I-beam cross-sectional or end shape (as shown in FIG. 3B), where the transverse widths of the bottom beam 53 and the top beam 55 are larger than the transverse width of the central beam 54 (and the central beam 54 is approximately centered along the transverse widths of the bottom beam 53 and the top beam 55). Accordingly, the extension frame 52 is configured and oriented in a completely different manner from conventional flexbeams about the feathering axis.

The bottom beam 53 and the top beam 55 extend radially and transversely parallel to each other and are axially spaced apart from each other (by the central beam(s) 54), in an axial or vertical direction that is substantially parallel to the rotor axis 11 (as shown in FIG. 3B). As shown in FIG. 3A, the bottom beam 53 and the top beam 55 may be radially and transversely aligned with each other. As shown in FIG. 3B, the bottom beam 53 is positioned axially directly below the bearing assemblies 60, 70, 80 and the top beam 55, and the top beam 55 is positioned axially directly above the bearing assemblies 60, 70, 80 and the bottom beam 53. Furthermore, at least a portion of the bearing assemblies 60, 70, 80 are radially aligned with the bottom beam 53 and the top beam 55. Accordingly, at least a portion of the bearing assemblies 60, 70, 80 are positioned axially between the bottom beam 53 and the top beam 55. By orienting the bottom beam 53 and the top beam 55 relative to each other in such a manner (i.e., axially above and below each other), the extension frame 52 is oriented to more efficiently handle the largest loads (which are in the vertical (axial) direction, which extends along, is parallel to, and corresponds to the rotor axis 11), compared to if the bottom beam and the top beam were positioned next to each other in a tangential direction perpendicular to the vertical direction (which extends along the rotor axis 11).

The bottom beam 53 and the top beam 55 are each configured to directly (separately and individually) mount, fasten, or attach to the rotor hub 40 (in a static or rigid manner) and extend radially outwardly from the rotor hub 40 along their length. Accordingly, as shown in FIG. 4, a radially-inward end portion of each of the bottom beam 53 and the top beam 55 define at least one (preferably two) through-hole 57 that is configured to receive the fastener (e.g., a bolt or screw) to statically or rigidly attach to the respective hub attachment portion 44 (in particular, to the lower attachment portion 46 and the upper attachment portion 48, respectively) of the rotor hub 40. According to one embodiment, the two through-holes 57 are transversely spaced apart from each other along the width of the end portion of the bottom beam 53 and the top beam 55.

As shown in FIG. 3B, the radially-inward end portions of the bottom beam 53 and the top beam 55 are configured to be positioned axially between each of the two extensions 45 of the lower attachment portion 46 and the upper attachment portion 48, respectively, of one of the hub attachment portions 44. The through-holes 57 of each of the bottom beam 53 and the top beam 55 are configured to axially align with the through-holes 47 of the lower attachment portion 46 and the upper attachment portion 48, respectively, such that each of the sets of through-holes 47, 57 are configured to receive a fastener (and the fastener can extend through all of the aligned through-holes 47, 57) to statically attach the extension frame 52 to the rotor hub 40 via, for example, a bolted connection with the through-holes 47, 57. With this arrangement, the top beam 55 and the bottom beam 53 are configured to fasten or attach to the upper attachment portion 48 and the lower attachment portion 46, respectively.

As shown in FIG. 4, the central beam 54 of the extension frame 52 extends axially (i.e., substantially vertically) between and connects the top beam 55 and the bottom beam 53. The extension frame 52 may include a plurality of central beams 54 (for example, two central beams 54) that are radially spaced apart from each other along the radial lengths of the top beam 55 and the bottom beam 53, thereby by creating radial gaps (between a central beam 54 and the rotor hub 40 and/or between two central beams 54) within which at least a portion of the bearing assemblies 60, 70, 80 can be positioned. The central beams 54 are radially and transversely aligned with the bearing assemblies 60, 70, 80 (along the lengths of the bottom beam 53 and the top beam 55). As described further herein, the central beams 54 each provide areas for the bearing assemblies 60, 70, 80 to directly and statically attach, fasten, or mount to.

Bearing Assemblies of the Extension Assembly

The extension assembly 50 includes at least one bearing assembly to stabilize the motion of the rotor blades 30. According to one embodiment, each of the extension assemblies 50 includes three elastomeric bearing blocks or assemblies 60, 70, 80 (i.e., an inboard pitch bearing assembly 60, a centrifugal bearing assembly 70, and an outboard pitch bearing assembly 80). Each of the three bearing assemblies 60, 70, 80 may be referred to as a first bearing assembly, a second bearing assembly, and a third bearing assembly. Each of the bearing assemblies 60, 70, 80 is configured to be statically and individually fastened or mounted to the extension frame 52 and to at least one of the leading edge 31 and/or the trailing edge 32 of the rotor blade 30 in a manner which permits a pitching motion of the rotor blade 30. As shown in FIG. 2C, the bearing assemblies 60, 70, 80 may be at least partially positioned, housed, or contained within the inner area 37 of and directly attached to the outer wall 35 of the blade neck 38 of the rotor blade 30.

As shown in FIGS. 6 and 8, the inboard pitch bearing assembly 60 and the outboard pitch bearing assembly 80 each support the rotor blade 30 by resisting deflection in the flapwise direction (i.e., in a direction along the rotor axis 11) and the edgewise direction (e.g., by reacting against the flapwise and edgewise motion of the rotor blade 30), while permitting rotation of the rotor blade 30 about the feathering axis 24. The flapwise motion extends along a direction corresponding to the rotor axis 11, and the edgewise motion extends along a direction corresponding to the edgewise axis 25, as shown in FIGS. 6-8. The inboard pitch bearing assembly 60 and the outboard pitch bearing assembly 80 each react to radial loads and allow the rotor blade 30 to react axially and to pitch about the feathering axis 24. As shown in FIG. 7, the centrifugal bearing assembly 70 supports the rotor blade 30 by resisting deflection along the edgewise axis 25 and reacts to the centrifugal forces, while permitting rotation about the feathering axis 24. The centrifugal bearing assembly prevents radial motion of the rotor blade 30 relative to the rotor axis 11 of the rotor hub 40.

As shown in FIGS. 5A-5B, each of the bearing assemblies 60, 70, 80 are axially and transversely aligned with each other and radially spaced apart from each other along the feathering axis 24 of the rotor blade 30. In particular, the inboard pitch bearing assembly 60 is positioned radially inward from the centrifugal bearing assembly 70 and the outboard bearing assembly 80. The centrifugal bearing assembly 70 is positioned radially in between the inboard pitch bearing assembly 60 and the outboard bearing assembly 80. The outboard bearing assembly 80 is positioned radially outward from the centrifugal bearing assembly 70 and the inboard pitch bearing assembly 60.

As shown in FIGS. 6-8, each of the bearing assemblies 60, 70, 80 includes a first bearing portion 61, 71, 81, a second bearing portion 62, 72, 82, and an elastomeric bearing 63, 73, 83, respectively. As shown in FIG. 3B, the first bearing portions 61, 71, 81 are statically attached or fastened to various portions (such as different portions of the central beams 54) of the extension frame 52. As shown in FIG. 2C in view of FIG. 3A, the second bearing portions 62, 72, 82 are statically attached or fastened to the leading edge 31 and the trailing edge 32 of the rotor blade 30. As shown in FIGS. 6-8, the bearings 63, 73, 83 are positioned between and rotatably attach the first bearing portions 61, 71, 81 and the second bearing portions 62, 72, 82 (respectively). Accordingly, the first bearing portions 61, 71, 81 and the second bearing portions 62, 72, 82 are rotatably or twistably attached together via the bearings 63, 73, 83, which allows the rotor blade 30 to move relative to the extension frame 52 (and thus relative to the rotor hub 40).

As shown in FIG. 2C, each of the bearing assemblies 60, 70, 80 are configured to be attached or fastened to the extension frame 52 and to the blade attachment holes 39 at the leading edge 31 and the trailing edge 32 of the rotor blade 30 (which are lower stress regions of the rotor blade 30 compared to the top portion 33 and the bottom portion 34 of the rotor blade 30). While not required in all aspects, the blade attachment holes 39 are at the leading edge 31 and the trailing edge 32 of the blade neck 38 in various embodiments. Each of the bearing assemblies 60, 70, 80 are not configured to be fastened or attached to (i.e., are detached, separated, or disconnected from) the top portion 33 or the bottom portion 34 of the rotor blade 30. Accordingly, the centrifugal load is reacted along the principal axis of the extension frame 52 without inducing internal moments within the extension frame 52. Comparatively, in conventional rotor systems, the centrifugal load is offset from the legs of the structure supporting the centrifugal bearing, which induces local bending in those legs.

With this configuration within the main rotor system 20, the outboard pitch bearing assembly 80 (which may connect to the rotor blade 30 using a recess in a bulkhead) no longer introduces twisting moments on its supporting structure and instead transmits bending moments into the extension frame 52 that can efficiently react these moments. Comparatively, in conventional rotor systems, the bearings are attached to the rotor blade through the top portion and/or the bottom portion of the rotor blade. Since the bending moments for coaxial rotor of a high-speed compound aircraft (e.g., an X2 rotor) are greatest in the flapwise direction (i.e., in a direction along the rotor axis 11), this configuration of conventional rotor systems results in connections between the rotor blade and the bearings being in the most highly stressed portions of the rotor blade.

Moving or rotating the connections between the bearing assemblies 60, 70, 80 and the rotor blade 30 (from being attached to the top and bottom of the rotor blade in conventional rotor system to being attached to the leading edge 31 and the trailing edge 32 of the rotor blade 30 in the present rotor system) allows for a more efficient structural load path between the bearing assemblies 60, 70, 80 and the rotor blade 30 and increases the flapwise stiffness of the rotor blade 30 (thus increasing the overall strength of the rotor blade 30). In particular, this configuration eliminates the torsion component in a bending reaction path, allows for a line of action reaction to each of the bearing assemblies 60, 70, 80, avoids bending (in particular with the centrifugal bearing assembly 70), and moves the connection of the rotor blade 30 to the rotor hub 40 (via the extension assembly 50) to a lower stress region of the rotor blade 30. Furthermore, this configuration allows the rotor blade 30 to need less buildup or added support in the inboard region of the rotor blade 30 because the locations of attachment to the bearing assemblies 60, 70, 80 (in particular, the locations of the blade attachment holes 39) are in more benign and less stressed locations along the rotor blade 30, and therefore have a smaller associated stress concentration factor. Accordingly, as the rotor blade 30 bends, the areas around the locations of the blade attachment holes 39 are less likely to fail due to lower stresses.

Each of the bearing assemblies 60, 70, 80 are configured to be individually attached or fastened to one of the rotor blades 30 and to a corresponding extension frame 52. To attach to the rotor blade 30, each of the second bearing portions 62, 72, 82 of the bearing assemblies 60, 70, 80 is statically or rigidly fastened, mounted, or attached to the rotor blade 30 via a fastener (e.g., a bolt or screw). Accordingly, as shown in FIG. 3A, each of the second bearing portions 62, 72, 82 defines at least one bearing attachment hole 69, 79, 89, respectively, that is configured to receive a fastener to extend through the bearing attachment hole 69, 79, 89 and the corresponding blade attachment hole 39. The bearing attachment holes 69, 79, 89 provide an area for each of the bearing assemblies 60, 70, 80 to be individually attached to the rotor blade 30 by statically attaching, mounting, or fastening the second bearing portion 62, 72, 82 to a portion of the rotor blade 30.

The bearing attachment holes 69, 79, 89 are oriented to face either the leading edge 31 or the trailing edge 32 of the rotor blade 30 (rather than the top portion 33 or the bottom portion 34 of the rotor blade 30) and are thereby each positioned to radially align with one of the blade attachment holes 39. Each of the second bearing portions 62, 72, 82 may include two bearing attachment holes 69, 79, 89, where a first bearing attachment hole 69, 79, 89 faces directly toward the leading edge 31 of the rotor blade 30 and a second bearing attachment hole 69, 79, 89 faces directly toward the trailing edge 32, directly opposite the first bearing attachment hole 69, 79, 89. Accordingly, a portion (i.e., the second bearing portions 62, 72, 82) of each of the bearing assemblies 60, 70, 80 may attach and be fastened to both the leading edge 31 and the trailing edge 32 of the rotor blade 30 (along opposite sides of the bearing assembly 60, 70, 80).

Each of the bearing assemblies 60, 70, 80, are attached, mounted, or fastened to the rotor blade 30 with at least one fastener (e.g., a bolt or screw) that extends through one of the blade attachment holes 39 of the rotor blade 30 and through a corresponding one of the bearing attachment holes 69, 79, 89 (thereby creating, for example, a bolted attachment or connection). Due to this configuration, the bearing assemblies 60, 70, 80 (or any associated attachments between the bearing assemblies 60, 70, 80 and the rotor blade 30) are not attached to and do not extend through the top portion 33 or the bottom portion 34 of the rotor blade 30.

To attach to the extension frame 52, each of the first bearing portions 61, 71, 81 of the bearing assemblies 60, 70, 80 is fastened, mounted, or attached to the extension frame 52 via at least one fastener that forms, for example, a bolted, clevis-style joint. Accordingly, as shown in FIGS. 5A-5B, each of the first bearing portions 61, 71, 81 includes at least one bearing attachment plate 67, 77, 87, respectively, that provides an area for each of the bearing assemblies 60, 70, 80 to be individually attached to the extension frame 52 by statically attaching, mounting, or fastening the first bearing portion 61, 71, 81 to a portion of the extension frame 52. Each of the first bearing portions 61, 71, 81 may include two bearing attachment plates 67, 77, 87 that extend parallel to each other (along the radial direction) and are spaced apart from each other (along the transverse direction).

Each set of two bearing attachment plates 67, 77, 87 are configured to be positioned along and attached to opposite sides of one of the central beams 54 of the extension frame 52. As shown in FIGS. 3B and 5A, each of the bearing attachment plates 67, 77, 87 defines at least one hole (such as a through-hole) that is configured to receive a fastener (e.g., a bolt or screw) that extends into both the bearing attachment plates 67, 77, 87 and at least a portion of the central beam 54 to statically or rigidly attach or fasten the first bearing portions 61, 71, 81 of the bearing assemblies 60, 70, 80 to the extension frame 52. Accordingly, a portion (i.e., the first bearing portions 61, 71, 81) of each of the bearing assemblies 60, 70, 80 is configured to be attached and fastened to and extend along opposite sides of one of the central beams 54. Optionally, more than one bearing assembly 60, 70, 80 may be attached to the same central beam 54 (e.g., along opposite radial ends of the central beam 54).

Although each of the various aspects, features, components, and configurations are not separately described for each embodiment, each of the various embodiments disclosed herein may have any of the aspects, features, components, and configurations of the other embodiments, except where noted otherwise.

As utilized herein, the terms "approximately," "substantially," and similar terms are intended to have a broad meaning in harmony with the common and accepted usage by those of ordinary skill in the art to which the subject matter of this disclosure pertains. The terms "approximately" and "substantially" as used herein refers to ±5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter described herein. For example, the position of elements may be reversed or otherwise varied, and the nature or number of discrete elements or positions may be altered or varied. The order or sequence of any process or method steps may be varied according to alternative embodiments. Other substitutions, modifications, changes and omissions may also be made in the design, operating conditions and arrangement of the various exemplary embodiments without departing from the scope of the present invention.

What is claimed is:

1. An extension assembly for a rotor system for rotating a plurality of rotor blades about a rotor axis with a central rotor hub that defines the rotor axis, the extension assembly comprising:
    a beam assembly configured to attach to the central rotor hub and positioned at least partially within a corresponding one of the plurality of rotor blades;
    a first bearing assembly configured to be fastened to the beam assembly and to at least one of a leading edge or a trailing edge of the corresponding one of the plurality of rotor blades,
    a second bearing assembly configured to be fastened to the beam assembly and the corresponding one of the plurality of rotor blades, wherein the second bearing assembly is not configured to be fastened to a top portion and a bottom portion of the corresponding one of the plurality of rotor blades; and
    a third bearing assembly configured to be fastened to the beam assembly and the corresponding one of the plurality of rotor blades, wherein the third bearing assembly is not configured to be fastened to the top portion and the bottom portion of the corresponding one of the plurality of rotor blades,
    wherein each of the first bearing assembly, the second bearing assembly, and the third bearing assembly are configured to individually fasten to the corresponding one of the plurality of rotor blades,
    wherein the beam assembly and the first bearing assembly are configured to attach one of the plurality of rotor blades to the central rotor hub such that the plurality of rotor blades are not otherwise attached to the central rotor hub.

2. The extension assembly of claim 1, wherein the first bearing assembly is disconnected from a top portion and a bottom portion of the corresponding one of the plurality of rotor blades.

3. The extension assembly of claim 1, wherein the first bearing assembly, the second bearing assembly, and the third bearing assembly are an inboard pitch bearing assembly, a centrifugal bearing assembly, and an outboard pitch bearing assembly.

4. The extension assembly of claim 1, wherein the beam assembly comprises a top beam and a bottom beam that are spaced apart from each other in an axial direction substantially parallel to the rotor axis.

5. The extension assembly of claim 4, wherein the top beam and the bottom beam are each configured to be individually fastened to the central rotor hub.

6. The extension assembly of claim 5, wherein the beam assembly comprises at least one central beam that extends substantially axially between and connects the top beam and the bottom beam.

7. The extension assembly of claim 6, wherein the first bearing assembly is configured to be fastened to and extend along opposite sides of the at least one central beam.

8. A rotor system comprising:
    the extension assembly of claim 4; and
    the central rotor hub, wherein the central rotor hub includes a hub mast and a plurality of hub attachment portions positioned about an outer circumference of the hub mast,
    wherein each of the plurality of attachment portions comprises an upper attachment portion and a lower attachment portion that are at least partially radially aligned with each other and are configured to attach to a portion of the extension assembly.

9. The rotor system of claim 8, wherein the top beam of the beam assembly is configured to fasten to the upper attachment portion, and the bottom beam of the beam assembly is configured to fasten to the lower attachment portion.

10. A rotor system comprising:
    a plurality of rotor blades;
    a central rotor hub defining a rotor axis and configured to rotate the plurality of rotor blades about the rotor axis; and
    a plurality of extension assemblies configured to attach to the central rotor hub and positioned at least partially within a corresponding one of the plurality of rotor blades,
    one or more of the plurality of extension assemblies comprising a first bearing assembly configured to be fastened to at least one of a leading edge or a trailing edge of the corresponding one of the plurality of rotor blades, the first bearing assembly being disconnected from a top portion and a bottom portion of the corresponding one of the plurality of rotor blades,
    wherein each of the plurality of extension assemblies further comprises
        a second bearing assembly configured to be fastened to the corresponding one of the plurality of rotor blades, wherein the second bearing assembly is not configured to be fastened to the top portion and the bottom portion of the corresponding one of the plurality of rotor blades,
        a third bearing assembly configured to be fastened to the corresponding one of the plurality of rotor blades, wherein the third bearing assembly is not configured to be fastened to the top portion and the bottom portion of the corresponding one of the plurality of rotor blades wherein each of the first bearing assembly, the second bearing assembly, and the third bearing assembly are configured to individually fasten to the corresponding one of the plurality of rotor blades, wherein the beam assembly and the first bearing assembly are configured to attach one of the plurality of rotor blades to the central rotor hub such that the plurality of rotor blades are not otherwise attached to the central rotor hub.

11. The rotor system of claim 10, wherein the first bearing assembly, the second bearing assembly, and the third bearing assembly are an inboard pitch bearing assembly, a centrifugal bearing assembly, and an outboard pitch bearing assembly.

12. The rotor system of claim 10, wherein each of the plurality of extension assemblies further comprises an extension frame configured to be fastened to the central rotor hub, wherein the first bearing assembly is configured to be fastened to the extension frame.

13. The rotor system of claim 12, wherein the extension frame comprises a top beam and a bottom beam that are spaced apart from each other in an axial direction substantially parallel to the rotor axis.

14. An aircraft comprising the rotor system of claim 10.

* * * * *